Nov. 18, 1924.
G. G. HEGERMAN
1,516,277
CINEMATOGRAPH PROCESS AND FILM
Filed Dec. 7, 1922
2 Sheets-Sheet 1
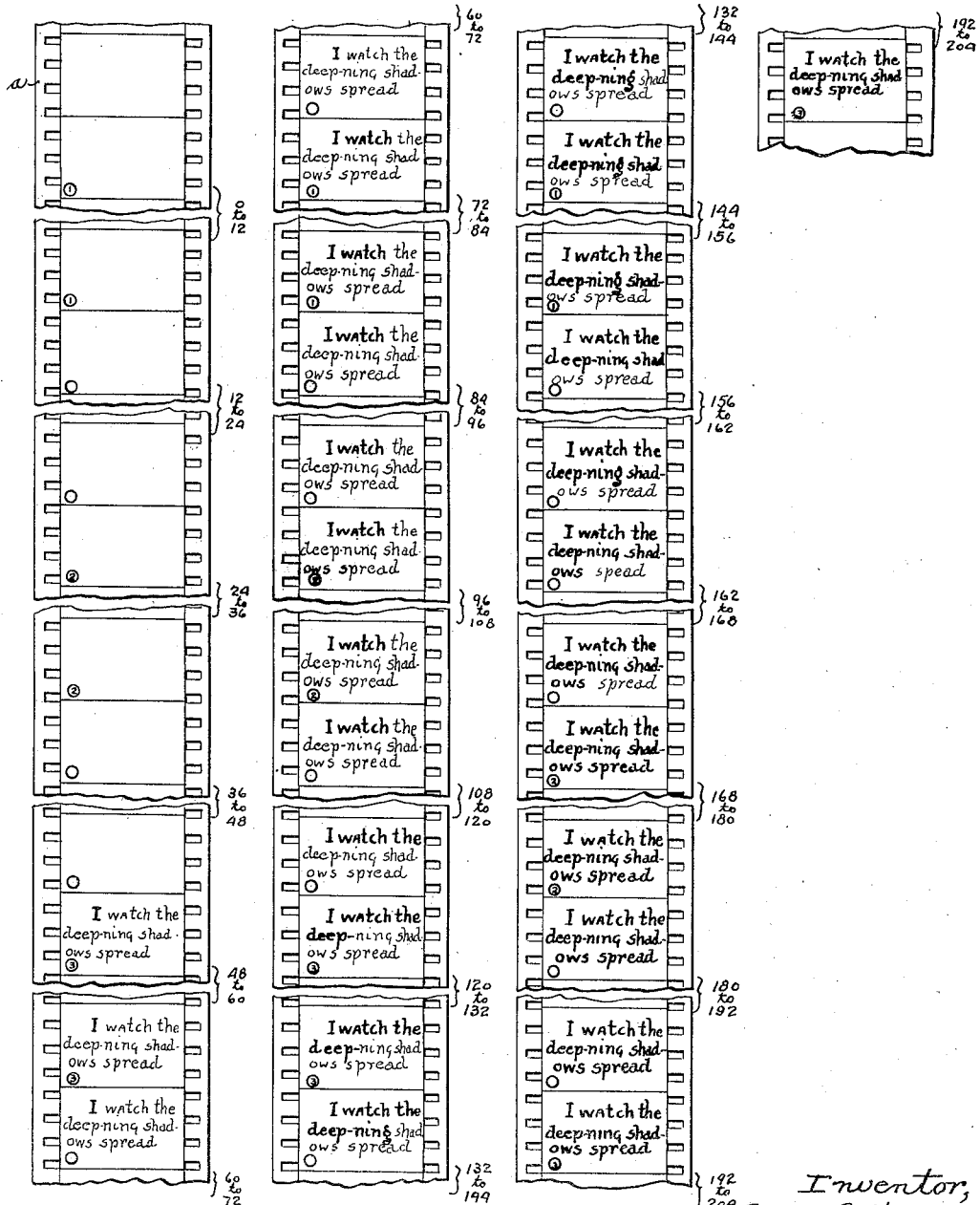

Nov. 18, 1924.
G. G. HEGERMAN
1,516,277
CINEMATOGRAPH PROCESS AND FILM
Filed Dec. 7, 1922
2 Sheets-Sheet 2
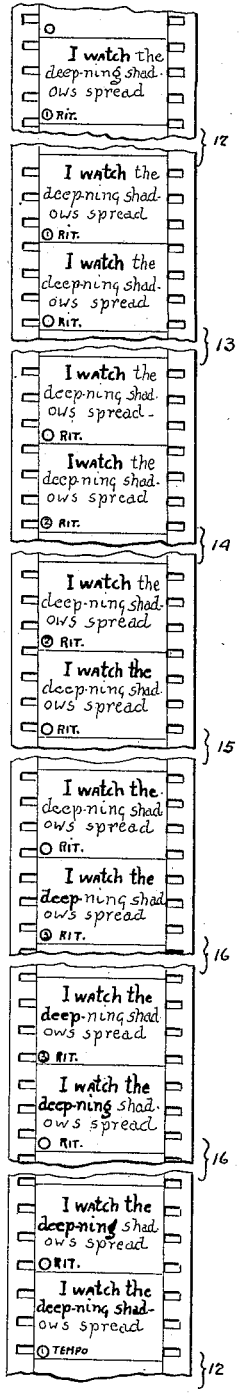
Fig. 3.
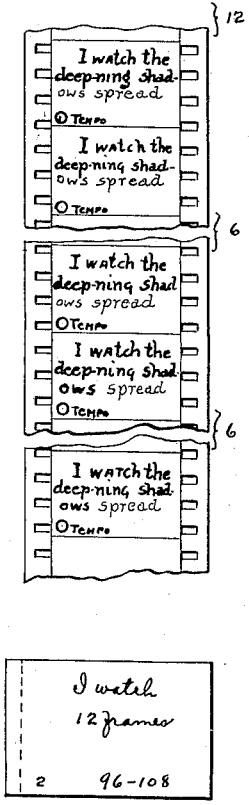
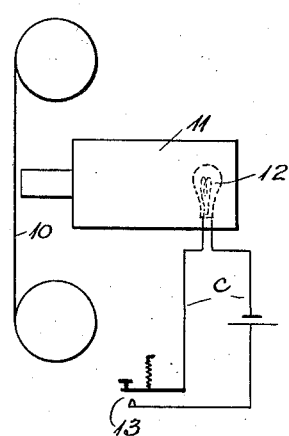
Fig. 4.
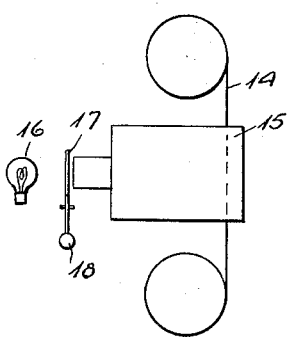
Fig. 5.
Fig. 8.
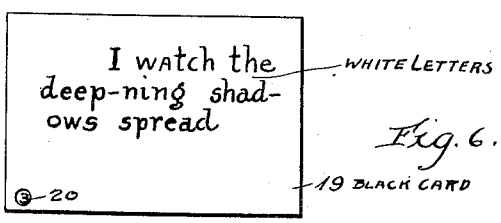
Fig. 6.
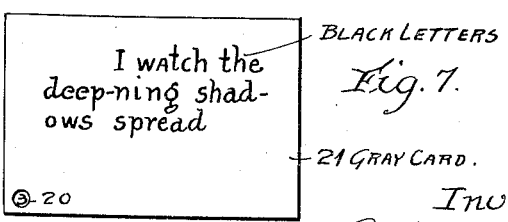
Fig. 7.
Inventor,
Gustave G. Hegerman
By Charles J. Schmidt
Atty.

Patented Nov. 18, 1924.

1,516,277

UNITED STATES PATENT OFFICE.

GUSTAVE G. HEGERMAN, OF CHICAGO, ILLINOIS.

CINEMATOGRAPH PROCESS AND FILM.

Application filed December 7, 1922. Serial No. 605,348.

*To all whom it may concern:*

Be it known that I, GUSTAVE G. HEGERMAN, a citizen of the United States, and a resident of Chicago, in the county of Cook and State of Illinois, have invented certain new and useful Improvements in Cinematograph Processes and Films, of which the following is a specification.

My invention relates to an improved cinematograph projecting process and films and improved procedure for making such films, the invention being of particular utility for facilitating community singing in moving picture houses. My invention may be considered as an improvement over the process disclosed in my Patent No. 1,483,581, February 12, 1924. In accordance with the process in this co-pending application the syllables or words of the text of a song are projected in sequence, that is, one at a time, in synchronism with the notes of the music to which the syllables or words are to be sung, and beat indications are shown on the screen for guiding the orchestra or accompanyist in keeping the proper time.

I have found that an audience can sing a song with greater interest and with less hesitancy if the entire text of the song or a full verse thereof is projected on the screen in its entirely while the singing is going on but with provision to accurately guide the audience in singing the syllables or words in sequence and in accurate synchronism with the notes of the music to which they are to be sung. This I accomplish by a system of differential light intensity or illumination of the text as a whole and of the syllables or words as they are to be sung. The text is projected on the screen under a certain light intensity or illumination so that it can be read by the audience and then the syllables or words are consecutively, that is, one at a time, given a contrasting light intensity to thus guide the audience in singing the words at the proper time and in full accord and synchronism with the music. For example, the text could appear on the screen dim or subdued, yet readable, and then the words of the text could be brought to full intensity in sequence and in time with the notes of the music to which they are to be sung. The audience while singing one word could readily see what was coming next, but would be accurately guided by the contrast in illumination effect and would be kept in accord with the music.

Another important object of the invention is to provide improved arrangement of the beat indications in order to permit them to be more readily followed by the conductor and to avoid mistakes and confusion.

The above and other features of my invention can be readily understood by reference to the accompanying drawing, on which—

Fig. 1 is a line of a song and the music to which it is to be sung,

Fig. 2 shows the arrangement on the film for a part of the song,

Fig. 3 shows a modified arrangement,

Fig. 4 diagrammatically shows one procedure for making a key,

Fig. 5 shows a modified arrangement for making a key,

Fig. 6 shows a card from which the song is photographed,

Fig. 7 is another card, and

Fig. 8 illustrates a manner of tabulating.

Cinematograph films are divided into successive exposure areas or frames, and the projecting machines are usually motor driven so that the film will travel accurately at a uniform rate of speed. In preparing a film for carrying out my invention, the first step will be to determine the number of frames to be devoted to each syllable, word or character in accordance with the music. This can be determined mathematically as disclosed in my co-pending application referred to. For example twenty-four film frames could be allotted to each quarter note and from this basis the number of frames for each syllable, word or character could be calculated, and then each syllable, word or character could be calculated, and then each syllable, word or character photographed on the determined number of consecutive frames. Such accurate mathematical allotment of frames does not permit of the infusion of personal element or interpretation into the rendering of a song, and I therefore provide simple procedure by which the frame numbers can be determined and which avoids the rigid mechanical rendition of the song and permits a more personal interpretation. A simple way of accomplishing this is diagrammatically illustrated in Fig. 4. A sensitized film 10 is run in a dark room through a projecting machine 11 at the usual uniform rate of speed, and the projector lamp 12 is included in a circuit c controlled by a switch 13. At each closure of the key the lamp will be illuminated and the film will be exposed, the number of film frames exposed depending upon the duration of closure of the key. The operator plays the song on the key 13 in the same manner as he would play it with one finger on a piano. The movements of the key, that is the closures and openings thereof, are in accord with the time values of the various notes and characters, either strictly or with personal interpretation infused. For example, if strict interpretation would give a certain note 24 frames, a retard or other musical liberty might give the note 26 frames.

After the film has been run through the projecting machine 11 and the song or a part thereof played the film is developed, the exposed frames showing black. It takes a little time to release the key after the playing of one note and depressing it for the playing of another, and during such time interval some of the frames at the end of each series will not have been exposed and consequently when the film is printed these frames will be transparent. The operator has therefore no difficulty in determining the divisions between the frame sets for the consecutive words. The developed film can be applied to a scale which has been subdivided in accordance with frame lengths and in this way the operator can quickly and accurately determine the number of frames required for each syllable, word or character.

In Fig. 5 I diagramatically show a modified procedure for determining the number of frames for the different words. A sensitized film 14 is run through a motor driven camera 15 at the same speed at which it will be run through the projecting machine, the application of the light 16 to the camera being controlled by the shutter 17 which may be operated by a key 18. The operator plays off the song on this key to cause the shutter to be opened and closed correspondingly, so that sets of film frames corresponding to the time values of the words will be exposed, and then after the film is developed it can be used directly as a key or it can be applied to the scale aforementioned and the number of frames requisite for each word or character more readily determined and the values could also be written down in tabular form to be used as the key as shown in Fig. 8.

The best indications which are shown in the form of numbers preferably appear on the screen in the lower left hand corner and may be visible to the audience or may be screened off to be visible only to the musicians or leaders. The number of frames to be allotted to the beat indications can readily be calculated and placed on the key as shown in Fig. 8. The song shown is written to three quarter time there being three beats to each measure. If, when operating the keys 13 or 18 (Figs. 4 and 5) the operator exactly follows the specified time of the song (as when employing a metronome) the same number of frames would be required for each beat. However when personal interpretation is infused the frame numbers may vary. Such frame numbers can however be accurately determined from the key showing the words and corresponding frames therefor.

After having prepared the key from which to operate, the preparation of the negative from which the projecting film is to be made is proceeded with. In accordance with my invention I desire the text of a song to be readable on the screen with provisions for pointing out to the audience the proper time when the words are to be sung. This can be accomplished in several ways. One way is diagrammatically illustrated by Fig 6. On a black card 19 proportionate in size to the size of the film frames the words are printed in white letters. If the song is short it may be printed entirely on the one card but if it is long only part of it is printed on a single card. The card is fixed in front of the camera aperture at the proper focus and a sensitized film is placed in the camera which may be hand driven or motor driven as desired, it being understood of course that the film will be advanced a frame at a time. The camera may have a register associated therewith for indicating the number of frames traveling therethrough, all in the well known manner. The film, during the first run through the camera to take the black card with the white letters thereon is underexposed sufficiently so that through the projecting film the letters on the screen would be readable but would be dim or pale. The film is then rewound and run through the camera a second time but under full exposure and in accordance with the frame number key already prepared and above referred to. If the frame numbers were figured out mathematically, that is exactly in accordance with the time specified for the song, the arrangement on the developed film would appear as shown on Fig. 2. Referring to the music Fig. 1 the first word "I" of the song falls on the third beat. If, for example, the key shows that each quarter note requires twenty-four frames then the film in the camera must be run off a number of frames to take care of the first two beats, in this case, forty-eight frames, the second run of the film being under full exposure. During these first forty-eight frames all the words on the card are blocked out with another black card, but in the sight opening 20 the proper beat characters are exposed to be photographed. In order to permit better reading of the beat characters and to avoid mistakes and confusion I have found it best to keep the beat indication visible only for a fraction of the total number of frames per beat, for example one-half of the total number. Accordingly therefore the beat indication 1 will appear in the sight opening 20 for the first twelve frames 0 to 12, and for the frames 12 to 24 a blank will be placed behind the opening 20. The words being still blocked out the beat indication 2 is placed in the opening 20 while the frames 24 to 36 are run off, and then the opening 20 is again blanked and frames 36 to 48 run off, and we are now ready to start with the song. The song starting with the word "I" on the third beat the beat indication 3 is placed in the sight opening 20 and all the words of the song with the exeception of the first word "I" are blocked out by the black card. The film is then advanced for the frames 48 to 60 when the sight opening 20 is again blanked and the film continued for the frames 60 to 72. Twenty-four frames were thus allotted to the word "I" but only the first twelve of these showed the beat indication 3. All this is diagrammatically illustrated on Fig. 2. The second word "watch" appears with the quarter note in the second measure of the song together with the prolongation character in the form of a dot which dot will prolong the quarter note by one-eighth and the combination will require thirty-six frames. All the words on the card with the exception of the words "I watch" are now blocked out and in the sight opening 20 the beat indication 1 is inserted and the film is then run off for the frames 72 to 84 whereupon the sight opening is blanked and the film continued for the frames 84 to 96. The beat indication 2 is then placed in the sight opening and the film continued for the frames 96 to 108. The thirty-six frames for the first note and character over the word "watch" have thus been accounted for.

The second, third and fourth notes of the second measure are each a one-eighth note and each requires twelve frames, the third beat of the measure being in time with the syllable "deep-". Accordingly for the twelve frames 108 to 120 the sight opening 20 is blank and the three words "I watch the" are exposed on the card and the word "the" will then be accounted for. For the next twelve frames 120 to 132 the words "I watch the deep-" are exposed and the beat indication 3 is applied at the sight opening 20, the frames 120 to 132 being run off, and the syllable "deep-" will be accounted for. For the next twelve frames 132 to 144 the words "I watch the deep-ning" are exposed on the card but the sight opening 20 is blank, and the first and second measures of the song are now accounted for. In the third measure the first note over the syllable "shad-" is an eighth note followed by a sixteenth prolongation dot, the note requiring twelve frames and the dot 6, a total of 18. The first note comes on the first beat and accordingly the beat indication 1 is placed in the sight opening 20 and the words "I watch the deepening shad-" are exposed on the card and the film is run off to expose the twelve frames 144 to 156, when the sight opening is blanked and the six frames 156 to 162 run off. The syllable "ows" in the third measure is under a sixteenth note and requires six frames. This syllable is added to the exposed words on the card and the sight opening 20 kept blank for the next six frames 162 to 168. The second word "spread" of the third measure appears under a quarter note and a one-eighth prolongation, requiring thirty-six frames in all, the word being in time with the second beat, and accordingly the word "spread" is added to the exposed words on the card and the beat indication 2 is applied in the sight opening 20, and the film is run for the twelve frames 168 to 180. The same words will again appear for the next twelve frames 180 to 192 but with the sight opening blank. The same procedure is now followed until all the words on the cards have been photographed consecutively under full exposure and with the proper beat indications. The exposed film is then taken from the camera and when developed will constitute the negative from which any number of projection films are printed.

When the projection film is run through a projecting machine the words of the song or of one verse will all be on the screen during the first two beats, and although readable the words will be dim or subdued against the black background owing to the under exposure during the first run of the photographing film. However beginning with the third beat the words will successively brighten up and show white, and as they brighten they are sung. The musician or orchestra leader will follow the beat indications and will thus keep the music in time with the song and the audience will have no difficulty in keeping in perfect synchronism and accord with the song and with the music. The audience may read ahead and be advised what is coming next but the words as they brighten and loom up will keep them accurately to the proper time and rythm. A song can thus be sung with greater effect and with less hesitation.

A film usually has a number of frames $a$ devoted to the introduction to the song or other matter. The number of frames required for this can be accurately determined and run off on the photograph film before the song follows, or the introduction or other matter could be put on a separate film and secured to the song film in the usual manner. Before developing the film after its second run it could be run through the camera again, and titles, scenes or other matter photographed thereon.

In Fig. 7 I have shown a modified arrangement for obtaining illumination contrast between the consecutive words. The text in black letters is printed on a gray card 21. The sensitized film with a sufficient number of frames is then run through the camera the first time under full exposure but with the beat indication sight opening blocked. The film is then rewound and run off for the first two beats, frames 0 to 48, with the proper beat indications in the sight opening 20. The first word "I" is then painted over to be white and the film run for the twelve frames 48 to 60 with the beat indication 3 in the sight opening, the sight opening being then blanked and the film continued for the twelve frames 60 to 72 and the first measure will be accounted for. The second word "watch" is now painted over white and the film run for the next twelve frames, 72 to 84 with beat indication 1 showing, and the sight opening being then blanked the film is run for another twelve frames 84 to 96. The beat indication 2 is then applied and the film run off with the same brightened words for the next twelve frames 96 to 108 and the first note and prolongation dot in the second measure are taken care of. This is continued, the words or syllables being consecutively painted white and the card photographed for the requisite number of frames with the beat indications appearing accordingly. The film when printed will constitute the negative from which any number of projection films can be printed and when the projection film is projected on the screen the text of the song will first appear in black letters on a gray background and then the words will consecutively appear white to guide the singers in keeping accurate time with the music.

Fig. 3 illustrates a modified arrangement where the frames are not calculated with mathematical accuracy, that is, in strict accord with the music characters, but liberties have been taken by the operator who prepared the key film. As shown the operator has introduced a "ritard" after the first note in the second measure. The stretch of film shown is that which corresponds to the frames 72 to 168 in the mathematical film of Fig. 1. Instead of twelve frames in each of the six frame sections shown there are respectively twelve, thirteen, fourteen, fifteen, and sixteen frames to take care of the ritard feature. The beat indication 1 will appear for the first set of twelve frames, and the sight opening will be blank for the set of thirteen. For the third set of fourteen frames the beat indication 2 will appear and for the fourth set of fifteen frames the sight opening will be blank.

I thus produce an improved process and film which will enable projection of a song so that it may be sung with greater accuracy, rhythm and enjoyment. I do not desire to be limited to the exact procedure and arrangement shown and described as changes and modifications can be made which will still come within the scope of the invention. I claim as follows:

1. The process of projecting a song to be sung to music accompaniment which consists in projecting the song text from a traveling film to appear on the screen during the entire singing of the song, and from the same film causing the appearance of the words to be changed in sequence for guiding the singers to sing the words in synchronism with the playing of the notes of the music to which the respective words are to be sung.

2. The process of projecting a song to be sung to music accompaniment which consists in projecting the song text from a traveling film to be on the screen during the singing of the song and at one degree of illumination so that the text may be read, and then from the same film causing the light intensity of the words of the text to be changed in sequence to guide the singers in singing the words in synchronism with the playing of the notes of the music to which the words are to be sung.

3. The process of projecting a song on the screen to be sung to music accompaniment, which consists in projecting on the screen from a film traveling at a uniform rate of speed the words of the song together with indications for guiding the singers to sing the words in synchronism with the playing of the respective notes of the music to which the words are to be sung, and from the same film projecting beat indications on the screen for the guidance of the accompanyist.

4. The process of preparing a cinematograph film for the projection of a song to be sung to music accompaniment which consists in running a sensitized film through the camera and photographing the song text at underexposure, then allotting a predetermined number of frames to each word of the text in accordance with the value of the respective note to which the word is to be sung, then running the film through the camera a second time and photographing the words consecutively at full exposure and each on the predetermined number of frames, whereby when such photographed film is developed and a projecting film printed therefrom is run at uniform speed through a projecting machine the text of the song on the screen will be dimmed but readable and the words will become consecutively brightened in synchronism with the playing of the music to which they are to be sung.

5. A cinematograph film of a song having on each of its frames the text of the song, the words of the text appearing progressively to a contrasting light intensity depending upon the quality of the notes to which the respective words are to be sung, so that when the film is run off at uniform rate the text of the song will show on the screen but the words will consecutively change in contrasting light intensity in synchronism with the notes as they are played.

6. The process of projecting a song on the screen to be sung to music accompaniment, which consists in projecting on the screen from a film traveling at a uniform rate of speed the words of the song together with indications for guiding the singers to sing the words in synchronism with the playing of the respective notes of the music to which the words are to be sung, and from the same film projecting beat indications on the screen for the guidance of the accompanyist, and with said beat indications appearing only for fractions of the respective beat periods.

7. The process of projecting a text to be followed by an audience which consists of projecting the entire text from a uniformly traveling film and from the same film projecting indicating means in association with the words in sequence and at the particular time when the words are to be read whereby reading of the text to a desired rhythm is accomplished.

In witness whereof, I hereunto subscribe my name this 2nd day of December, A. D. 1922.

GUSTAVE G. HEGERMAN.